United States Patent [19]

Reiterman et al.

[11] Patent Number: 5,513,931
[45] Date of Patent: May 7, 1996

[54] ELLIPTICAL CUTTING INSERT FOR A MILLING CUTTING TOOL

[75] Inventors: Lee Reiterman, Royal Oak; Paul R. Doxen, Clinton Township; James D. Lark, II, West Bloomfield, all of Mich.

[73] Assignee: Valenite Inc., Madison Heights, Mich.

[21] Appl. No.: 277,053

[22] Filed: Jul. 19, 1994

[51] Int. Cl.⁶ .................................................. B23C 5/02
[52] U.S. Cl. ............................................ 407/113; 407/42
[58] Field of Search ................................ 407/34, 36, 42, 407/53, 113, 114, 115, 116

[56] References Cited

U.S. PATENT DOCUMENTS

| | | |
|---|---|---|
| 4,294,565 | 10/1981 | Erkfritz ................................. 407/115 |
| 4,636,116 | 1/1987 | Shikata ............................... 407/114 X |
| 4,659,264 | 4/1987 | Friedline . |
| 5,052,863 | 10/1991 | Satran . |
| 5,071,292 | 12/1991 | Satran . |
| 5,078,550 | 1/1992 | Satran et al. . |
| 5,197,831 | 3/1993 | Shiatori et al. ........................ 407/114 |
| 5,199,827 | 4/1993 | Pantzar . |
| 5,244,318 | 9/1993 | Arai et al. . |
| 5,368,418 | 11/1994 | Bentjens et al. ....................... 407/114 |

*Primary Examiner*—S. Thomas Hughes
*Attorney, Agent, or Firm*—John W. Gregg

[57] ABSTRACT

An insert for a peripheral rotary milling cutter having replaceable cutting inserts. Each cutting insert having a cutting rake surface and a relief flank surface and an elliptical cutting edge defined between the cutting rake surface and the relief flank surface.

5 Claims, 5 Drawing Sheets

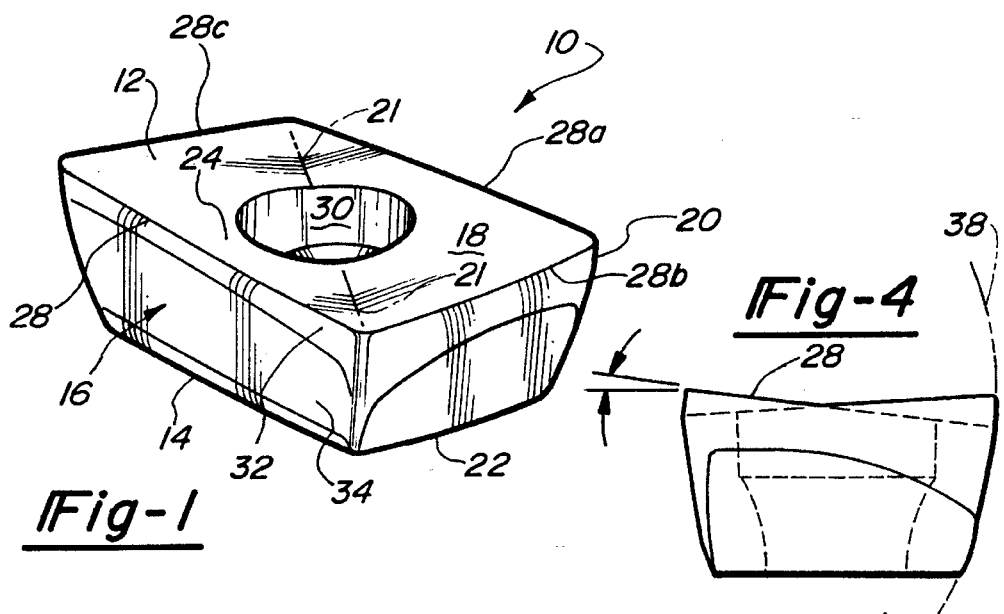
Fig-1
Fig-4
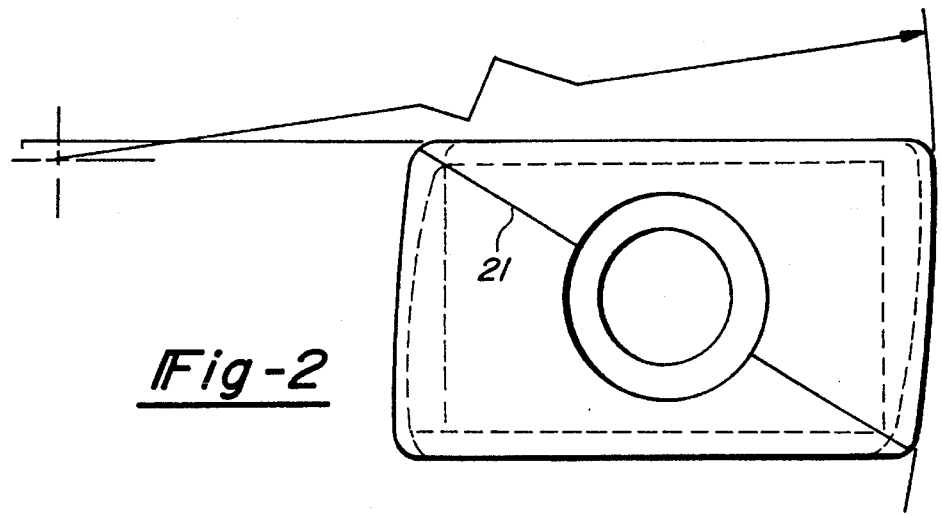
Fig-2
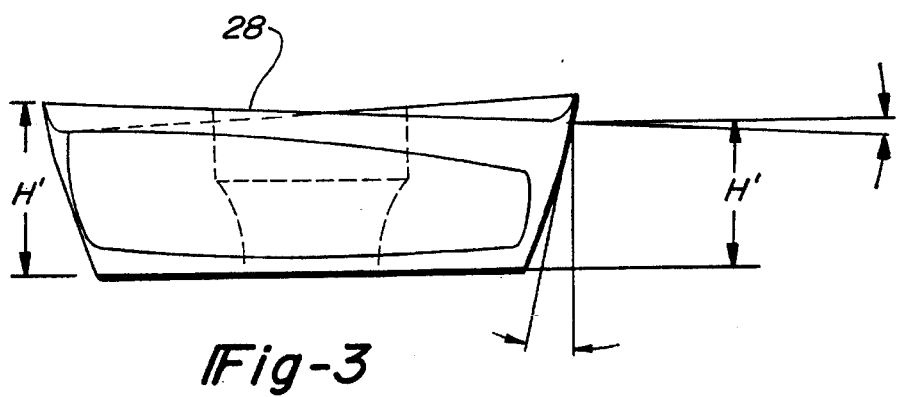
Fig-3

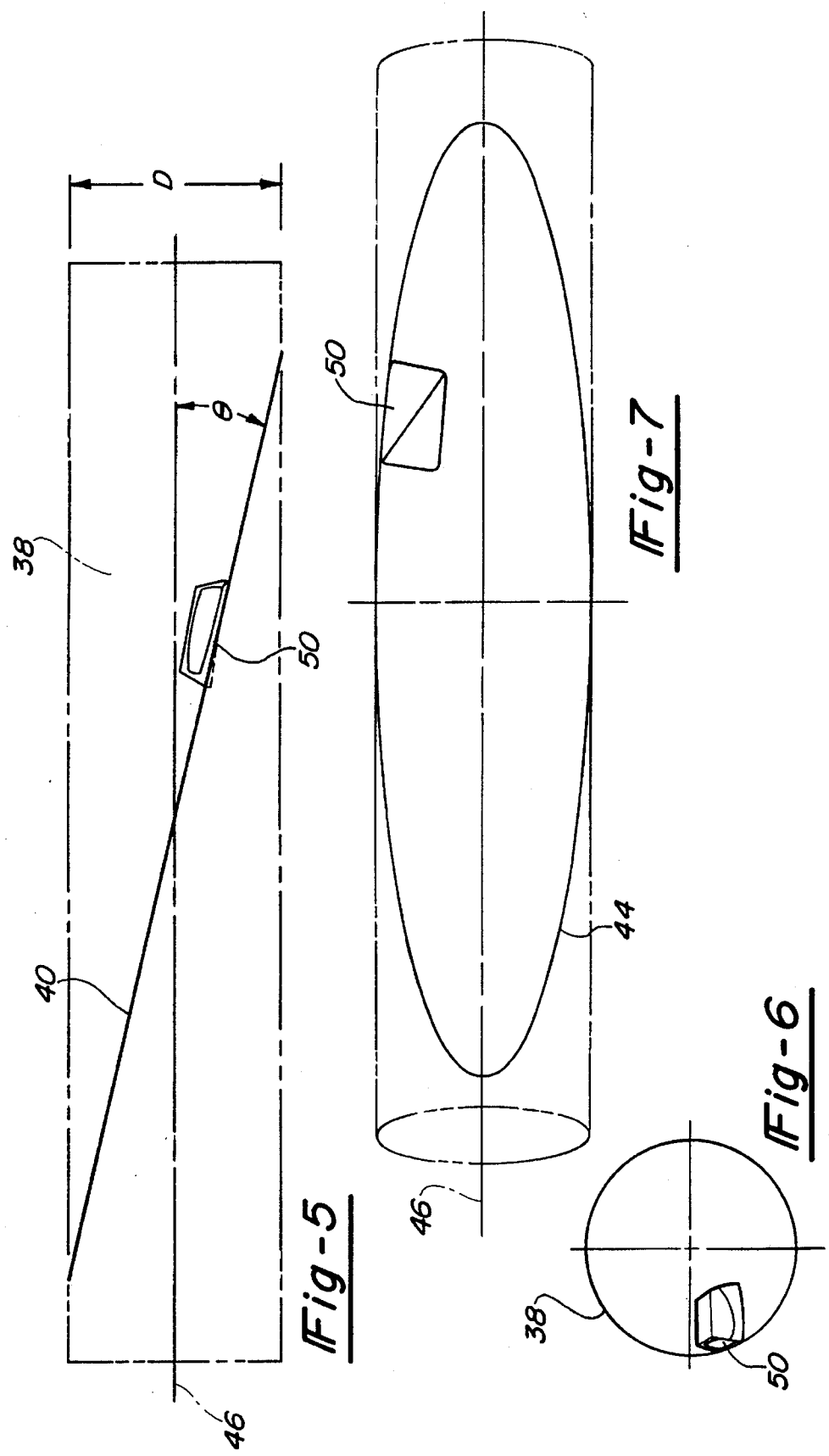

ELLIPTICAL CUTTING INSERT FOR A MILLING CUTTING TOOL

BACKGROUND OF THE INVENTION

1. Field of the Invention

The present invention relates to a peripheral rotary milling cutter comprising a substantially cylindrical holder in which are formed one or more peripheral recesses in which are respectively and releaseably mounted a corresponding number of indexable hard metal cutting inserts. Each recess furthermore provides a chip gullet space in front of each insert.

The present invention further relates to a cutting insert having an elliptical cutting edge whereby a substantially smooth milled surface can be prepared during rotary cutting or milling.

2. Description of the Related Developments

Satran U.S. Pat. No. 5,052,863 discloses a cutting insert for use in peripheral rotary milling cutters. The cutter has a cylindrical holder and a plurality of replaceable, peripherally disposed cutting inserts. Each insert is formed with at least one cutting edge defined between a cutting rake surface and a relief flank of the insert. The cutting edge is curved along a circular radius which is an approximation of a curved side of a plane which intersects a cylinder consisting of a surface of revolution of said cutting edge at an angle corresponding to the axial rake angle of the insert in the milling cutter.

The curvature of the cutting edge of the insert of Satran is represented by the following relationship:

$$r = \frac{\left(\frac{l}{4}\right)^2 - \left(\frac{\frac{D}{2} - \sqrt{\frac{D^2}{4} - \frac{l^2}{4}\sin^2\alpha_A}}{2}\right)^2}{\frac{D}{2} - \frac{\sqrt{\frac{D^2}{4} - \frac{l^2}{4}\sin^2\alpha_A}}{2}}$$

wherein:

r is the radius of curvature of the cutting edge;

l is the length of a chord joining the ends of the curved cutting edge;

D is the diameter of a cylindrical envelope of the cutting edge; and $\alpha_A$ is the axial rake angle.

The equation set forth in Satran '863 describes a curve which is circular, and only approximates an ellipse within a given chord length. The insert of the present invention is truly elliptical and has an instantaneous radius of curvature which may be defined as follows:

$$\rho = \frac{\left[1 + \frac{4 \cdot (\sin(\theta))^4 \cdot x^2}{D^2 - 4 \cdot (\sin(\theta))^2 \cdot x^2}\right]^{3/2}}{\left|\frac{8 \cdot (\sin(\theta))^4 \cdot x^2}{D^3} \cdot \left[1 - \frac{4 \cdot (\sin(\theta))^2 \cdot x^2}{D^2}\right]^{-3/2} + \frac{2 \cdot (\sin(\theta))^2}{D} \cdot \left[1 - \frac{4 \cdot (\sin(\theta))^2 \cdot x^2}{D^2}\right]^{-1/2}\right|}$$

wherein:

ρ is the instantaneous radius of curvature of the cutting edge;

X is the length of a line from and normal to the semi-minor axis of the ellipse to any point along the ellipse.

D is the diameter of the cylindrical envelope of the cutting edge, and

θ is the axial rake angle.

As can be seen with regard to the equation in the present application, the instantaneous radius of the curvature varies along the edge of one quadrant of an ellipse, and is not related to or dependent upon any given chord length.

SUMMARY OF THE INVENTION

The present invention relates to an insert for a peripheral rotary milling cutter having replaceable cutting inserts. Each cutting insert has a cutting rake surface and a relief flank surface and an elliptical cutting edge defined between the cutting rake surface and the relief flank surface. The instantaneous radius of curvature of a point on the cutting edge is given by the relationship:

$$\rho = \frac{\left[1 + \frac{4 \cdot (\sin(\theta))^4 \cdot x^2}{D^2 - 4 \cdot (\sin(\theta))^2 \cdot x^2}\right]^{3/2}}{\left|\frac{8 \cdot (\sin(\theta))^4 \cdot x^2}{D^3} \cdot \left[1 - \frac{4 \cdot (\sin(\theta))^2 \cdot x^2}{D^2}\right]^{-3/2} + \frac{2 \cdot (\sin(\theta))^2}{D} \cdot \left[1 - \frac{4 \cdot (\sin(\theta))^2 \cdot x^2}{D^2}\right]^{-1/2}\right|}$$

wherein:

ρ is the instantaneous radius of curvature of a point on the cutting edge;

X is the length of a line from and normal to the semi-minor axis of the elipse to any point on the ellipse.

D is the diameter of the cylindrical envelope of the cutting edge, and

θ is the axial rake angle.

It is further contemplated that the relief flank surface may comprise a continuously curved upper portion, a substantially planar intermediate portion and a continuously curved lower portion. The upper and lower portions are curved along the same curved surface.

The insert as described maximizes the strength of the insert at the cutting edge, thereby increasing tool life. The elliptical cutting edge enables machining of a truly square shoulder by positioning the insert cutting edge in the cutter body so that the cutting edge is oriented along the axial rake angle θ.

BRIEF DESCRIPTION OF THE DRAWINGS

FIG. 1 is a three dimensional perspective view of the cutting insert of the present invention.

FIG. 2 is a top view of the cutting insert of the present invention.

FIG. 3 is a side view of the cutting insert of the present invention.

FIG. 4 is an end view of the cutting insert of the present invention showing the curved relief flank surface.

FIG. 5 is a representation of the cylindrical cutting envelope with a plane disposed as the axial angle intersecting all surfaces of the cylinder showing the cutting edge of the cutting insert.

FIG. 6 is an end view of the cylindrical envelope.

FIG. 7 is the cut away view of the cylindrical envelope showing the elliptical surface formed by the intersection of the plane with the cylindrical envelope.

DETAILED DESCRIPTION OF THE PREFERRED EMBODIMENT

Figure 8:
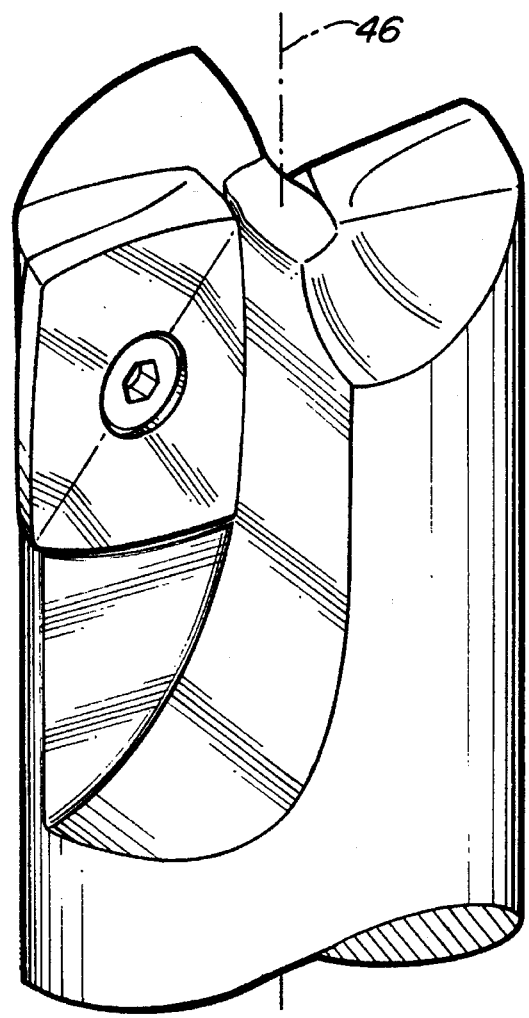
FIG. 8 is a detailed view of the insert in a rotary cutting tool.

Turning now to the drawings, wherein like numbers refer to like structures, and specifically to FIG. 1, insert 10 has a top 12 a bottom or base 14 and a side wall 16 running substantially unbroken there between to defined body 18. End relief flanks 22 are defined by the portion of that sidewall 16 which is between any two corners 20 of the insert. The top 12 of the insert is inclined from the cutting edge toward the center of the insert along midline 21. Midline 21 extends from one of the corners to the corner diagonally opposite it. This forms a cutting rake surface 24 along the flanks, the relief flank surface 32 is curved along an elliptical form. Cutting edge 28 is formed by the intersection of the cutting rake surface and the relief flank surface. This cutting edge is elliptical in form, and is described by the instantaneous radius of curvature equation and other equations as hereinafter described. This cutting edge differs from the circular cutting edges which are set forth in the prior art. Indeed, it is now possible to form elliptical cutting surfaces where, insofar as it is known, it had previously been possible only to reach an approximation of an elliptical cutting edge.

As can be seen with reference to FIG. 3, the cutting edge is not parallel to the corresponding edge of the insert base or bottom but is directed at an acute angle with respect to the corresponding edge of the insert base. The cutting edges 28 and 28a slope in opposite senses so as to define acute angles with the corresponding edges of the base of the insert, thereby defining oppositely directed acute angles to the opposite sides of the insert. Thus, the height H of the insert at the diametrically opposed corners thereof is greater than the height $H^1$ of the insert at the other pair of diametrically opposed corners. It therefore follows that the front and rear cutting edges 28B and 28C slope in opposite directions defining acute angles with the corresponding front and rear edges of the base of the insert.

Turning to FIGS. 5 through 8, there is shown therein cylindrical envelope 38 which is formed by rotating the cutting insert 50 about axis 46. A plane 40 is passed there through at an angle equal to the axial angle θ of the insert. The intersection of the plane with the cylindrical envelope defines an ellipse 44.

The preferred shape of the insert cutting edge is a segment of an ellipse defined as the intersection of an inclined plane with a cylinder. To define this cutting edge, the system of the plane and the cylinder are viewed 90 degrees from the intersecting plane. In this position the plane appears as a line inclined at an angle θ FIG. 5, and this angle is measured between the centerline of the cylinder 46 and the plane 40.

Figure 9:
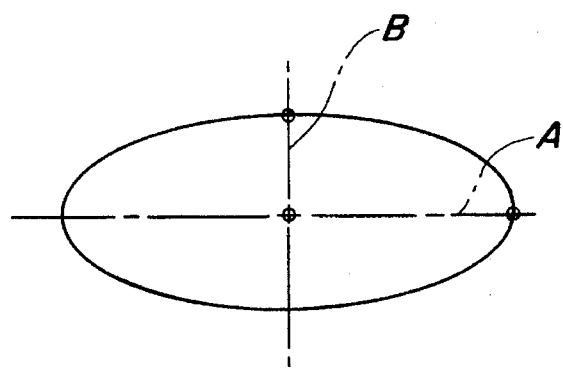
FIG. 9 is a view of the ellipse, showing the semi-major axis A and the semi-minor axis B.

The elliptical shape of the cutting edge is fully defined in terms of the cylindrical diameter D and the angle θ. The relationship is derived as follows, with reference being made to FIG. 9.

In general, an ellipse is defined by the equation:

$$\frac{X^2}{A^2} + \frac{Y^2}{B^2} = 1 \quad (1)$$

wherein:

A is the semi major axis, and

B is the semi minor axis.

Referring now to FIG. 5, in order to derive the equation for an ellipse in terms of D and θ, one may resort to the trigonometrical functions of angles:

Generally:

Described in terms of the ellipse:

$$\sin \Theta = \frac{\text{Diameter of Cylinder}/2}{\text{Semi Major Axis}} \quad (2)$$

Therefore:

$$A = \frac{D}{2 \sin \Theta} \quad (3)$$

To define the semi minor axis:

(4) B=diameter of cylinder/2

Therefore:

$$B = \frac{D}{2} \quad (5)$$

By substituting the derived values of "A" and "B" into equation (1), $$\left(\frac{4 \sin^2 \Theta}{D^2}\right) X^2 + \left(\frac{4}{D^2}\right) Y^2 = 1 \quad (6)$$

This equation, however, defines the full ellipse traveling through the cutting edge of the insert. So, to specifically establish the cutting edge, it is necessary to define two (2) limit points on the ellipse, which are designated as $X_1 Y_1$ and $X_2 Y_2$.

In the same orientation that was previously used to describe θ, the two limit points can be defined as distances from the centerline of the cylinder to establish $X_1 Y_1$ and $X_2 Y_2$ on the ellipse. The distances will be called Ac1 and Ac2, where Ac1>Ac2. If one or both of the points are behind the centerline of the ellipse they will be negative values.

Figure 10:
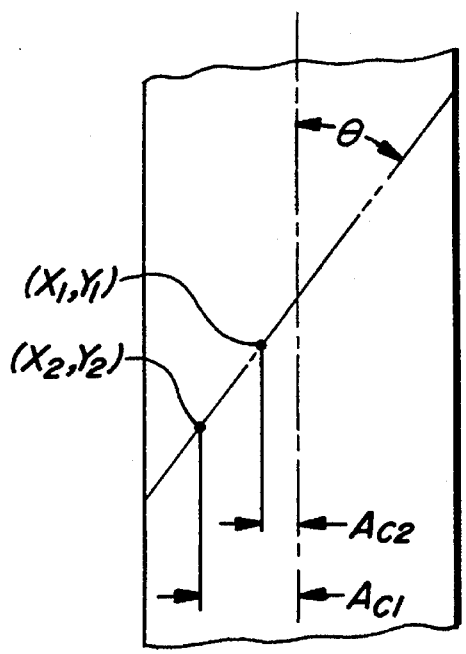
FIG. 10 is a detailed view of the cylindrical envelope showing the derived values of X and Y on a Cartesian coordinate plane.
Figure 11:
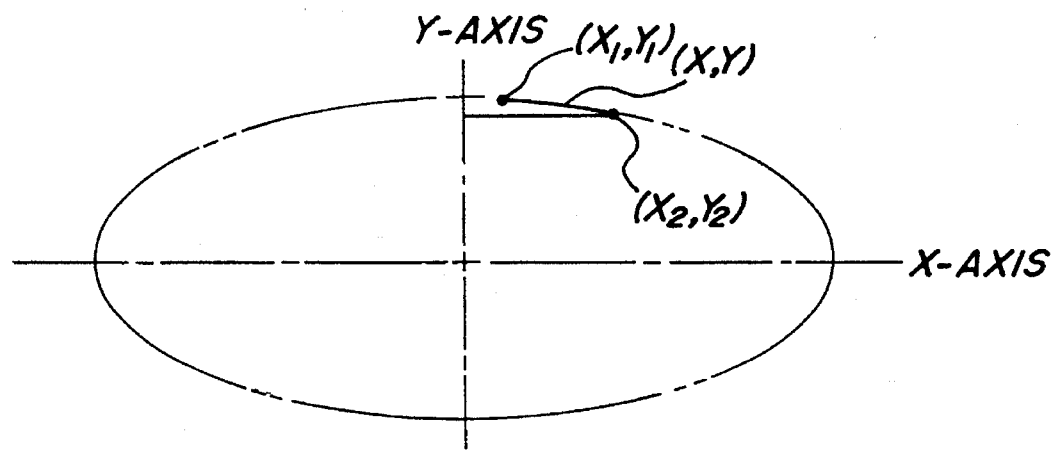
FIG. 11 is a detailed view of the ellipse showing the general limits of points along the ellipse.

These values can be related to X and Y values in a cartesian coordinate plane as seen in FIGS. 10 and 11, whose X-Axis corresponds to the major axis of the ellipse and whose Y-Axis corresponds to the minor axis. In order to relate these values, they must be expressed in terms of D, θ, Ac1, and Ac2. Generally, $$X_1 \leq X \leq X_2$$

By using trigonometrical functions of angles shown in FIGS. 10 and 11

$$X_2 = \frac{Ac1}{\sin \Theta} \quad (7)$$

Likewise, $$X_1 = \frac{Ac2}{\sin \Theta} \quad (8)$$

To find the corresponding Y-Axis values, $X_1$ and $X_2$ are substituted back into the equation (6). Therefore, when these values are substituted into the general limit formula, specific upper and lower limit values for X define the elliptical edge of the insert in terms of D, θ, Ac1, Ac2. The boundary for X is given by:

$$\frac{Ac2}{\sin\Theta} \leq X \leq \frac{Ac1}{\sin\Theta} \quad (9)$$

Any X value that satisfies these boundaries will be on the elliptical edge of the insert. X can then be substituted into the specific ellipse equation to obtain the corresponding Y value.

Likewise, any Y value chosen, which satisfies the ellipse and boundary formula, will be on the elliptical edge of the insert.

Restated, the specific ellipse equation (6), along with the boundary condition (9), fully defines the insert's elliptical edge. Every X and Y value that satisfies the formulas lies on the elliptical segment.

The elliptical edge of the insert has a varying radius of curvature along that edge. The instantaneous radius of curvature, can be shown as follows:

$$\rho = \frac{\left[1 + \frac{4 \cdot (\sin(\theta))^4 \cdot x^2}{D^2 - 4 \cdot (\sin(\theta))^2 \cdot x^2}\right]^{3/2}}{\left[\frac{8 \cdot (\sin(\theta))^4 \cdot x^2}{D^3} \cdot \left[1 - \frac{4 \cdot (\sin(\theta))^2 \cdot x^2}{D^2}\right]^{-3/2} + \frac{2 \cdot (\sin(\theta))^2}{D} \cdot \left[1 - \frac{4 \cdot (\sin(\theta))^2 \cdot x^2}{D^2}\right]^{-1/2}\right]}$$

This instantaneous radius of curvature is not an approximation of the cutting edge, but rather an exact description of the varying radii along the ellipse. Any point along the edge of the insert can be substituted into the radius of curvature equation to give the instantaneous radius of curvature.

The insert may further be provided with top form variations which are useful in producing different rake faces for the insert. Some variations can be seen in FIGS. 12 through 15.

The top forms would be designed to maximize an inserts' effectiveness when cutting various materials.

Figure 12:
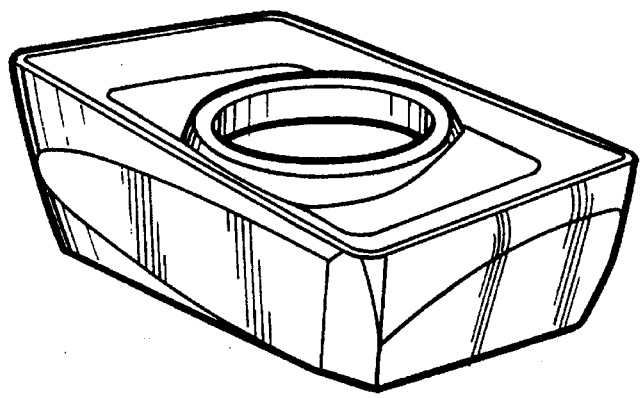
FIG. 12 through 15 are perspective views of the insert with different top form variations.

FIG. 12 with a land around the periphery and downwardly sloping rake faces might be used for cutting a variety of steel materials.

Figure 13:
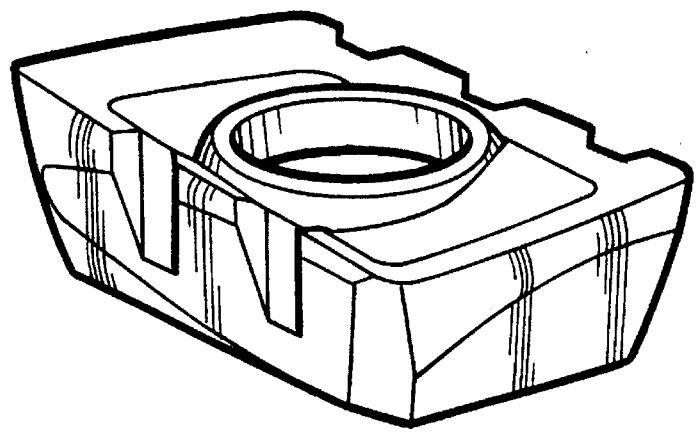

FIG. 13 might be used on roughing cuts and features chip splitting notches to cut smaller chips that are easier to evacuate.

Figure 14:
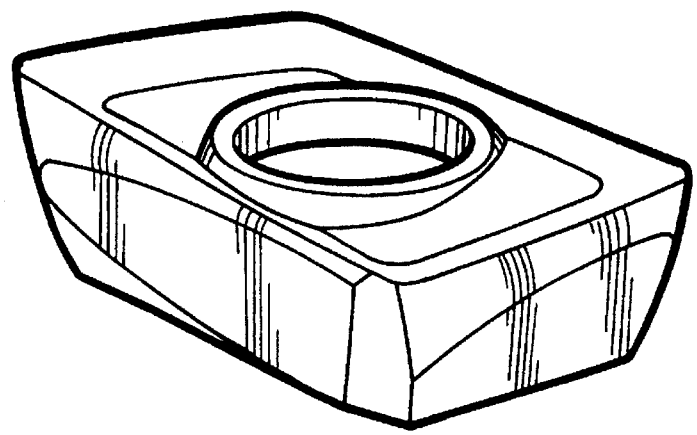

FIG. 14, similar to FIG. 12 without a peripheral land and with increased downwardly sloping rake faces could be used for cutting Aluminum and/or Titanium.

Figure 15:
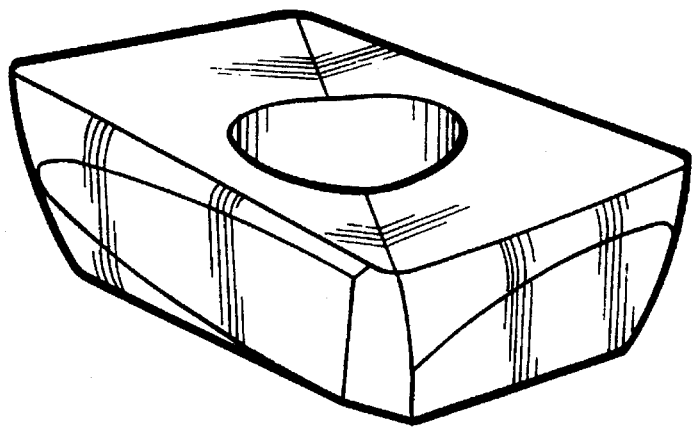

FIG. 15 with intersecting top rake faces might be considered a general or heavy duty design used on materials such as steel, cast iron, aluminum, titanium etc.

Those skilled in the art recognize that many variations are possible without departing from the scope and spirit of the invention.

We claim:

1. An insert for a peripheral rotary milling cutter having replaceable cutting inserts, each cutting insert having a cutting rake surface and a relief flank surface and an elliptical cutting edge defined between the cutting rake surface and the relief flank surface, the instantaneous radius of curvature of a point on the cutting edge being given by the relationship:

$$p = \frac{\left(1 + \frac{4 \cdot \sin(\theta)^4 \cdot x^2}{D^2 - 4 \cdot \sin(\theta)^2 \cdot x^2}\right)^{3/2}}{\left[\frac{8 \cdot \sin(\theta)^4 \cdot x^2}{D^3} \cdot \left(1 - \frac{4 \cdot \sin(\theta)^2 \cdot x^2}{D^2}\right)^{-3/2} + \frac{2 \cdot \sin(\theta)^2}{D} \cdot \left(1 - \frac{4 \cdot \sin(\theta)^2 \cdot x^2}{D^2}\right)^{-1/2}\right]}$$

wherein:

= the instantaneous radius of curvature of a point on the cutting edge

D = the diameter of the cylindrical surface of revolution of the cutting edge about the rotary axis of the cutter θ = the axial rake angle x = in the ellipse defined by intersection of a plane inclined at the axial rake angle with the cylindrical surface of revolution, the length of a line from and normal to the semi-minor axis of said ellipse to any point on said ellipse.

2. The insert according to claim 1, wherein the cutting edge is inclined with respect to the corresponding edge of a base of the cutting insert.

3. The insert according to claim 1, wherein the relief flank surface comprises a continuous surface.

4. The insert according to claim 1, wherein the relief flank surface comprises a continuously curved upper portion and a planar lower portion.

5. The insert according to claim 1, wherein the relief flank surface comprises a continuously curved upper portion, a planar intermediate portion, and a continuously curved lower portion, said upper and lower portions being part of the same curved surface.

\* \* \* \* \*